United States Patent [19]
Fowler

[11] Patent Number: 5,673,534
[45] Date of Patent: Oct. 7, 1997

[54] RECLOSABLE STORAGE BAG

[75] Inventor: Dwight P. Fowler, Middlefield, Conn.

[73] Assignee: Simple Packaging Solutions, Inc., Sausalito, Calif.

[21] Appl. No.: 494,286

[22] Filed: Jun. 23, 1995

[51] Int. Cl.$^6$ .................... B65B 9/06; B65B 51/30
[52] U.S. Cl. .................... 53/133.4; 53/552; 53/374.6; 53/375.3; 493/194; 493/206; 493/927; 493/930
[58] Field of Search .................... 53/133.4, 139.2, 53/552, 551, 374.6, 374.2, 374.5, 375.3, 374.8; 493/194, 206, 927, 930

[56] References Cited

U.S. PATENT DOCUMENTS

| | | |
|---|---|---|
| 3,184,149 | 5/1965 | Repko. |
| 3,217,971 | 11/1965 | Shvetz. |
| 3,311,288 | 3/1967 | Lemelson. |
| 3,426,959 | 2/1969 | Lemelson. |
| 3,480,198 | 11/1969 | Repko. |
| 3,538,676 | 11/1970 | Runo et al. ............ 53/374.6 |
| 3,618,850 | 11/1971 | Palmer. |
| 3,674,135 | 7/1972 | Simon. |
| 4,630,429 | 12/1986 | Christine. |
| 4,682,976 | 7/1987 | Martin et al. ............ 53/139.2 |
| 4,782,951 | 11/1988 | Griesback et al. |
| 4,945,714 | 8/1990 | Bodolay et al. |
| 5,014,493 | 5/1991 | West .................... 53/552 X |
| 5,127,208 | 7/1992 | Cuter et al. |
| 5,284,002 | 2/1994 | Fowler et al. |

FOREIGN PATENT DOCUMENTS

| | | |
|---|---|---|
| 1488310 | 7/1967 | France. |
| 1150037 | 4/1969 | Germany. |

Primary Examiner—Linda Johnson
Attorney, Agent, or Firm—Pearson & Pearson

[57] ABSTRACT

A reclosable bag includes a detachable reclosure tie having a tail portion formed by a series of spaced elongated seals and a closed loop. Apparatus for forming the reclosure tie with a bag includes first and second sealing jaws with external and internal grippers for holding web material. The first sealing jaw carries cutting and perforating knives and a cooling block that directs cooling air onto the knives to prevent the knife temperature from rising to the melting temperature of the web material. Each sealing jaw contains a heating block with complementary sealing surfaces for forming various seals including the seals that form the tail portion of the reclosure tie.

14 Claims, 7 Drawing Sheets

RECLOSABLE STORAGE BAG

BACKGROUND OF THE INVENTION

1. Field of the Invention

This invention generally relates to packaging and more specifically to a storage bag that is easily reclosed and to methods and apparatus for making such a storage bag.

2. Description of Related Art

Extensive efforts have been directed to producing a storage bag that is easily opened and then reclosed. These efforts have led to criteria for judging the potential success of such storage bags. Consumers require that such bags must be easily opened, reclosed and then reopened. The method of reclosure must be positive. From a manufacturer's standpoint, the method and apparatus used to form the bag and reclosure structure must be easily added to a production line, operate without any appreciable reduction in production rates, add minimal production costs, have the capacity to be used with bags requiring a freshness seal and produce little or no waste material.

U.S. Pat. No. 5,284,002 discloses a reclosable storage bag and a method and apparatus for manufacturing such bags that meets essentially all the foregoing criteria. In accordance with that disclosure, a storage bag with a reclosure tie is produced by forming a sealable, elastic, polymeric film into an open-ended, hollow cylinder that extends along a first axis. A portion of the film cylinder is clamped along a second axis that is transverse to the first axis to form a margin portion in coextensive film wall portions. The margin has first and second sections disposed along the second axis to provide a boundary between successive storage bags. A line of perforations is formed in the margin portion that is parallel to the second axis. The film walls are also severed in the margin portion along a severance line that is parallel to and spaced from the second axis. The perforation and severance line define a removable disclosure tie between the perforation and severance lines and an adjacent first sealing area.

In accordance with that disclosure, impulse or resistance sealing jaws form first and second seals. The first seal is formed in the film walls along a line in the first sealing area that is parallel to the second axis and is coextensive with both the first and second sections. The second seal is parallel to the second axis and extends only across the first section to produce a tail while the film walls in the second section remain unsealed and form a loop. The tie is looped around an opened bag with the tail through the loop. Pulling the tail tightens the loop thereby reclosing the bag.

In the foregoing patent, a resistance sealing jaw includes a heat sealing bar having an extensive area across the first portion to form the seals for the reclosure tie. In some situations it has been found that this resistance heating structure, that is proximate knives that perforate and sever the film cylinder, can heat the knives so film material touching the knives can soften and accumulate on the knives. This accumulation ultimately requires that the apparatus be stopped so the knives cam be removed and cleaned. Such stoppages can reduce the productivity of resistance sealing jaws by a measurable and therefore oftentimes unacceptable amount.

SUMMARY

Therefore it is an object of this invention to provide a method and apparatus for manufacturing a reclosable bag that is easy to open, that contains a reclosure tie that facilitates the subsequent closure and reopening of the bag and that enables maintenance of high production rates normally associated with such apparatus.

Still another object of this invention is to provide a reliable and economical method and apparatus for manufacturing a reclosable bag.

Still another object of this invention is to provide a structure for a reclosable storage bag that is readily adapted for manufacture on resistance Sealing packaging equipment.

Still another object of this invention is to provide resistance sealing jaws for reliably and economically manufacturing a reclosable storage bag.

In summary and in accordance with one aspect of this invention, a storage bag with a reclosure tie is produced by forming heat-sealable elastic polymeric film into an open-ended, hollow structure formed by walls of the film and extending along a first axis. A portion of the hollow structure is clamped along a second axis that is transverse to the first axis to form a margin portion in coextensive film wall portions. The margin portion has first and second sections disposed along the second axis to provide a boundary between successive storage bags. A line of perforations is formed in the margin portion that is parallel to the second axis. The film walls are also severed in the margin portion along a severance line that is parallel to and spaced from the second axis. The perforation and severance lines define a removable closure tie between the perforation and severance lines and an adjacent first sealing area. A first seal is formed in the film walls along a line in the first sealing area that is parallel to the second axis and coextensive with both the first and second sections. A second seal that is parallel to the second axis and extends only across the first section comprises a plurality of sealed portions that extend parallel to the second axis whereby portions of the first section are sealed and unsealed.

In accordance with another aspect of this invention, apparatus for manufacturing storage bags from a continuous cylinder lying along a first axis and formed of a heat sealable polymeric film includes a pair of counterfacing sealing jaws. The sealing jaws include a plurality of coacting gripper portions that engage and hold the film walls therebetween. Heating assemblies in each of the sealing jaws include means for providing at least one seal across the entirety of the storage bag. A second portion of the heating assembly includes a plurality of sealing fingers in each of the jaws that coact to produce a series of spaced seals in an area coextensive with the first section parallel to the second axis. Cooling means are interfitted around the sealing fingers to direct a gaseous coolant across fixed perforation and severing knives.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

RECLOSABLE BAG 100

Figure 1:
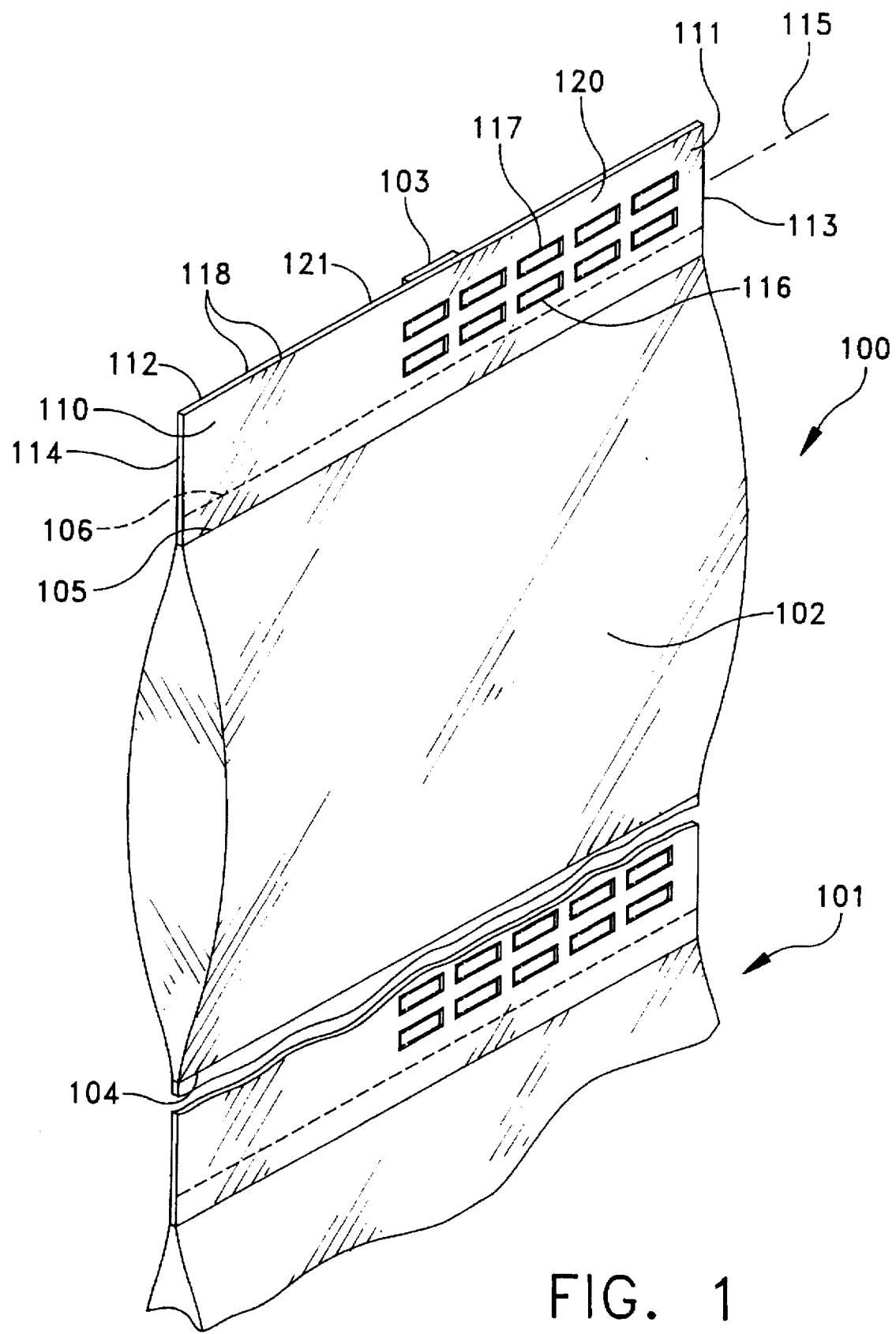
FIGS. 1 through 3 depict a reclosable storage bag constructed in accordance with this invention.

FIG. 1 of the drawings depicts a bag 100 that is formed of an elastic coextruded polymer such as high density polyethylene and ethyl vinyl acetate or a copolymer including polyethylene. When heat is applied to adjacent film layers, the material seals, typically by fusing. These films are also characterized by reasonably high resistance to puncture and to the initiation of a tear. It is intended that the phrase "sealable elastic polymeric material" include all such polyethylene-based materials as well as other materials that exhibit similar characteristics. Such materials may also be co-extruded with other films for particular applications and still use the foregoing characteristics. FIG. 1 also depicts an adjacent, or lower, bag 101 after being severed from the bag 100 as occurs in a normal production of successive storage bags. Each bag has the same basic construction.

Using the storage bag 100 as an example, the film forms a generally cylindrical open-ended pouch 102 comprising a sheet of the sealable elastic polymeric material or film form wrapped around a cylinder or mandrel. The edges overlap and produce a longitudinally extending backseam 103. A "bottom" seal 104 and a "top" seal 105 close the ends of the pouch 102 so the bag can store food or other articles. A perforation line 106 defines a boundary between the storage bag 100 and an attached, integral reclosable tie 110.

Specifically the reclosable tie 110 constitutes a margin portion and includes film layers on extensions 111 and 112 beyond the seal 105. The extensions 111 and 112 terminate at margin end portions 113 and 114 and the reclosure tie 110 lies along an axis 115 that parallels the top seal 105. Two sets 116 and 117 of aligned, elongated, spaced fused seals parallel to the axis 115 and extend from the margin end 113 to a position intermediate the backseam 103 and the margin end 114. A top edge 118 of the extensions 111 and 112 constitutes a parting line for adjacent bag.

The portion of the extensions 111 and 112 that are coextensive with the spaced seal sets 116 and 117 along the axis 115 produce a tail portion 120 in which the layers 111 and 112 are fused together at spaced locations. The remaining portions of the extensions 111 and 112 including the end 114 form a loop portion 121. As shown in FIG. 1, therefore, each of a series of storage bags such as storage bags 100 and 101 has an integral extension of the film forming two layers beyond a top seal line. The extensions form a tail and loop structure that can be readily torn from the bag along the perforation line 106.

Figure 2:
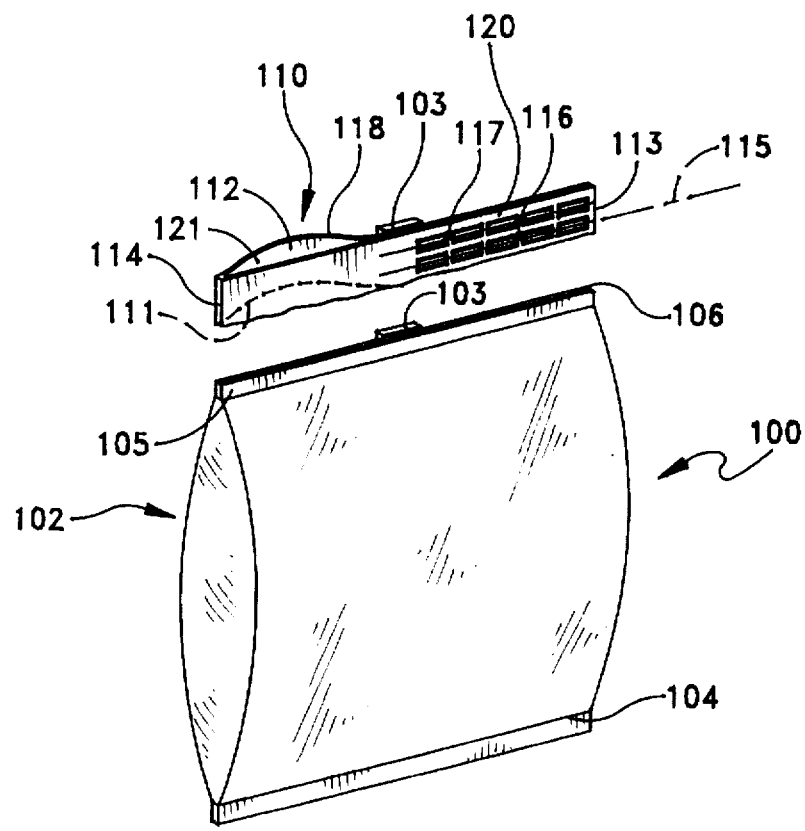
Figure 3:
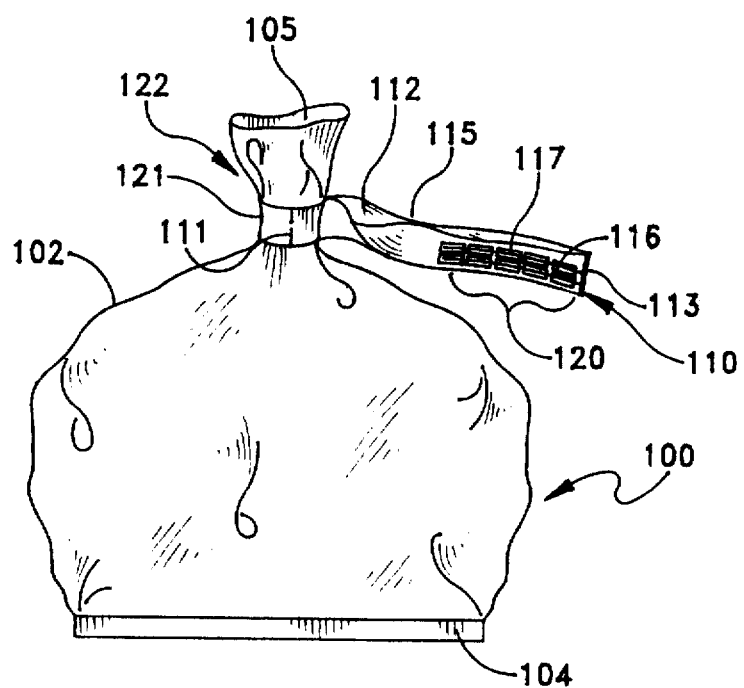

To open the bag, a consumer tears the reclosable tie 110 from the bag 100 along the perforation 106 as shown in FIG. 2. Then the consumer separates the film layers along the top freshness seal 105 to open the bag fully. After some of the contents are removed, the individual gathers the bag 100 above the remaining contents to form a closed neck 122 as shown in FIG. 3, wraps the reclosure tie 110 around the neck 122 and passes the tail portion 120 through the loop portion 121. When the consumer pulls the tail portion 120, the reclosure tie 110 slides longitudinally such that the loop 121 adjacent the margin end 114 slides along and tightens the noose formed around the gathered neck 122.

All pressure on loop 121 is applied against the end 114 that preferably is free of any material that might otherwise delaminate, such as the backseam 103. When the loop 121 is firmly cinched in place and the tail portion 120 is released, the material, that stretched in tension, relaxes. The end margin 114 of the loop 121 cinches against the tail portion 120 thereby preventing its inadvertent loosening. However, as is characteristic in such loops, intentional release of the reclosure tie 110 is readily accomplished by sliding the end of the loop 121 toward the margin end 113 of the tail portion 120 thereby releasing the cinching action and enabling a consumer to readily remove the closure tie.

The bag 100 achieves certain objects of this invention. Primarily the reclosure tie 110 is formed integrally with the bag during the bag forming and filling processing and only with a nominal amount of additional material. Thus, the cost of the bag 100 should not be significantly greater than that of a conventional bag without the reclosure tie 110. Moreover, conventional form, fill and seal pouch apparatus can produce bags, such as the bag 100 of FIGS. 1 through 3, successively without significant modification.

APPARATUS FOR FORMING BAGS

As known in the art, typical vertical form and fill apparatus passes a film of the sealable elastic polymeric material from a supply roll past a guide roller and over a panning shoulder to form the film into a folded, vertically moving web about a cylindrical mandrel. First sealing apparatus forms the backseam 103 as the web moves over the mandrel to produce a continuously advancing open-ended film cylinder. A hopper dispenses a measured amount of contents through the mandrel into a pouch that has been formed above a bottom seal by closed sealing jaws during a prior operation.

Figure 4:
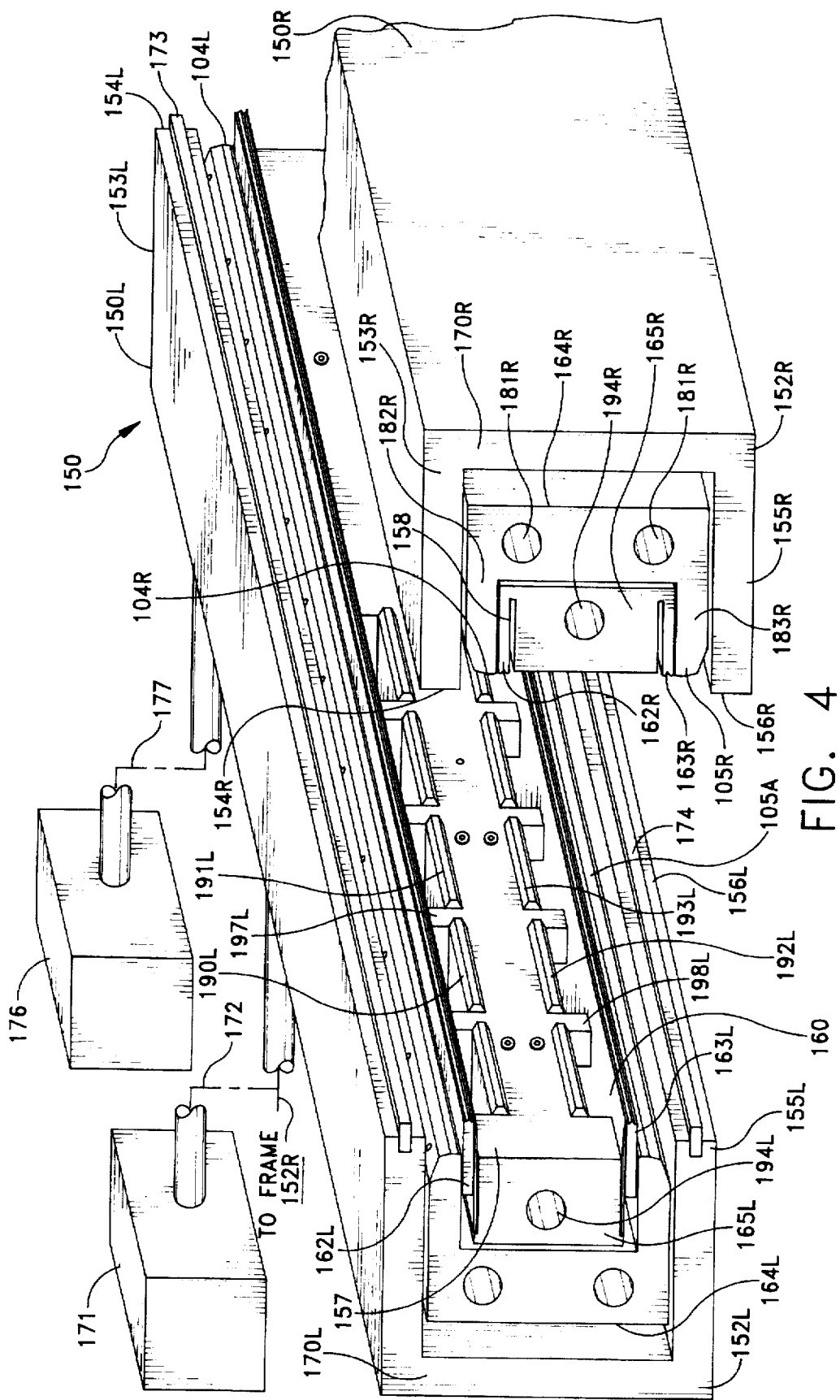
FIG. 4 is a perspective view of one embodiment of first and second sealing jaws for producing the reclosable bag shown in FIGS. 1 through 3 in accordance with other aspects of this invention.
Figure 5:
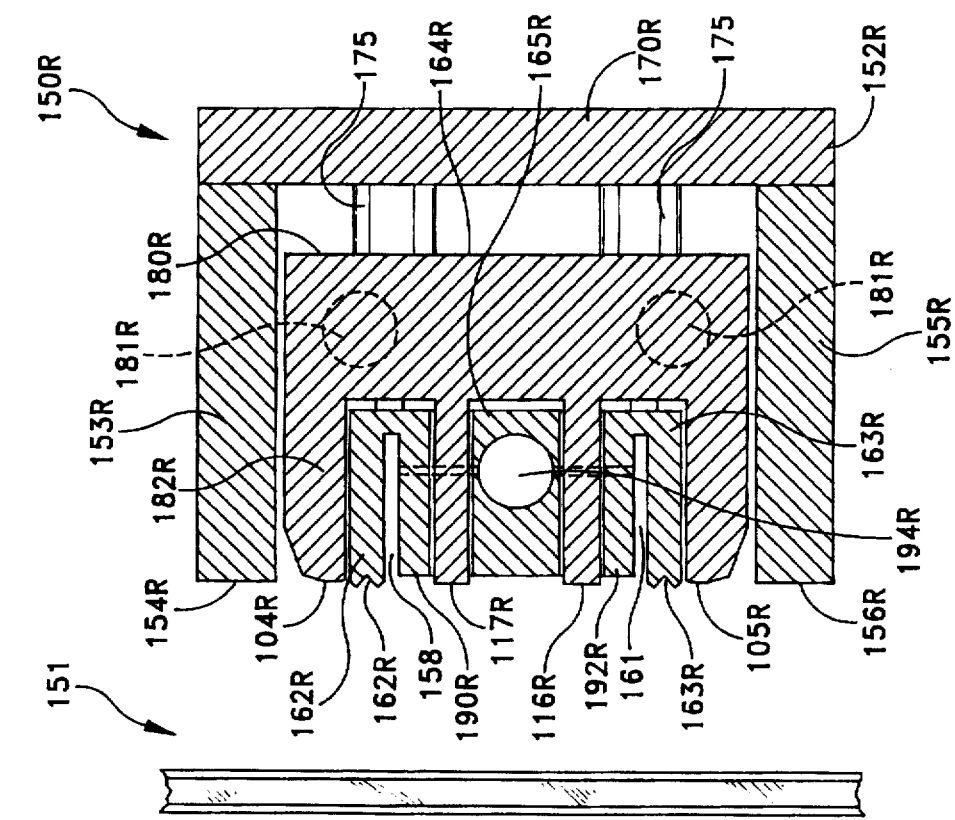
FIG. 5 is a cross-section of the sealing jaws in a partial cross-section while they are apart.
Figure 5:
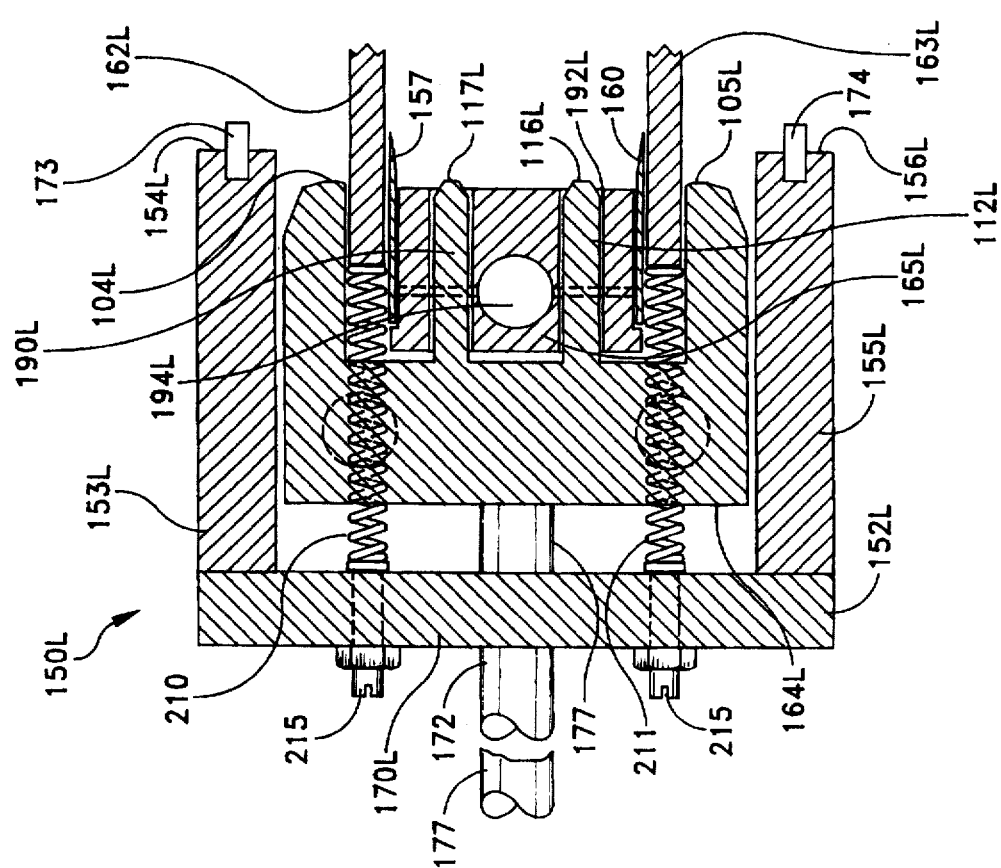
Figure 6:
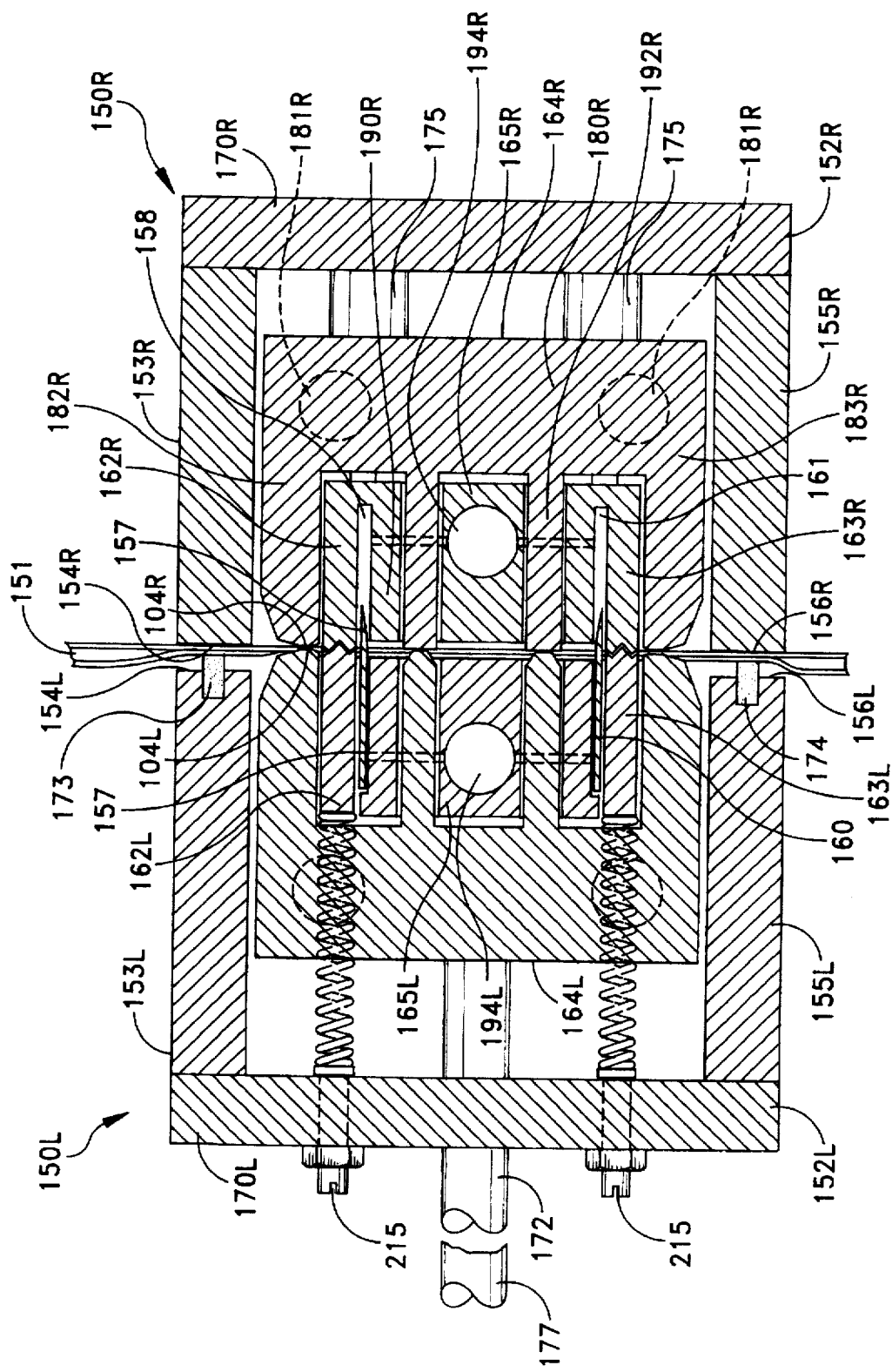
FIG. 6 is a cross-section of the sealing jaws when they are moved together to form a seal between successive bags.

Each of FIGS. 4 through 6 depicts a set 150 of sealing jaws that mount for reciprocal motion to and from a moving web 151 of film (i.e., horizontally in FIGS. 5 and 6). FIGS. 5 and 6 particularly depict the disposition of the individual sealing jaws 150L and 150R on opposite sides of the moving web 151. In the art, individual jaws in a set 150 are sometimes referred to as "front" and "rear" sealing jaws. For purposes of this discussion, it is assumed that the front jaw 150L is on the left and that the rear jaw 150R is on the right. When individual elements in the sealing jaws have complementary functions, their locations are designated by the suffix "L" if located on the front or left sealing jaw and "R" if located on the rear or right sealing jaw. In collective reference to such elements, the reference numeral will be used without a suffix. For example, the sealing jaws 150L and 150R are referred to collectively as sealing jaws 150.

In use, the sealing jaws 150 maybe transported on a carriage to an upper position in the retracted position shown in FIG. 5. Mechanisms on the carriage then move the sealing jaws 150L and 150R toward each other to capture the web material 151 between them. Such carriages and reciprocating mechanisms are well known in the art. Then such a carriage moves downwardly to move the web material 151 along a vertical axis over the mandrel to pull the material to a lower position. After the sealing jaws 150L engage the web material 151, knives perforate and cut the web material 151 along lines 106 and 118. Then the sealing jaws 150 form the upper seal 105 in the bag 101 and the lower seal 104 in the next bag 100 and the spaced seal sets 116 and 117. The apparatus simultaneously dispenses contents from the hopper through the mandrel to fill the bag 100.

When the sealing jaws 150 reach the bottom of travel along the mandrel axis, the sealing jaws 150 retract. At this point the bottom bag 101 drops away with its contents. The carriage then moves sealing jaws 150 back along the mandrel axis to a position corresponding to the top of the filled bag. At the top of this motion, the sealing jaws 150 are positioned to close, grab the web material 151 above the contents and pull another section of film into appropriate position to form another bag.

Referring to FIGS. 4 and 5, the sealing jaws 150L and 150R include outer frames 152L and 152R with upper gripper bars 153L and 153R with oppositely facing web gripping surfaces 154L and 154R. Lower gripper bars 155L and 155R define oppositely facing web gripping surfaces 156L and 156R. When the sealing jaws 150L move from their retracted positions shown in FIG. 5 to the closed positions shown in FIG. 6, the gripping surfaces 154 and 156 engage or clamp the web material 151 between the sealing jaws 150. As previously described, that portion of the web material 151 between the upper and lower gripping bars 153 and 155 constitutes a margin portion between the bottom of an upper bag and the top of a lower bag such as the margins formed by the extensions 111 and 112 in FIG. 1.

Still referring to FIGS. 4 through 6, after the sealing jaws 150L move to the closed position shown in FIG. 6, additional operations occur. First, a cutting knife 157 on the movable sealing jaw 150L advances through the web material 151 into a recess 158 in the sealing jaw 150R along the parting line 118 shown in FIG. 1. A perforation knife 160 also moves through the web material 151 into a recess 161 in the fixed sealing jaw 150R to form the perforation line 106 shown in FIG. 1. This operation preferably occurs after upper internal grippers 162L and 162R and lower internal grippers 163L and 163R engage to stabilize the web material 151 during the cutting and sealing operations. However, in some situations upper and lower internal gripper bars 162 and 163 could engage essentially simultaneously with contact between the knives 157 and 160 engage the web material 151.

Thereafter, counterfacing elongated sealing surfaces in sealing elements 164L and 164R produce the seals 104 and 105 and the spaced seal sets 116 and 117. Specifically sealing surfaces 104L and 104R form the seal 104; sealing surfaces 105L and 105F, seal 105; spaced Sealing surfaces 116L and 116R, the set of seals 116; and spaced sealing surfaces 117L and 117F, the set of seals 117.

SEALING JAW STRUCTURE

With this basic understanding of the construction and operation of the sealing jaws 150, the detailed structure of the left sealing jaw 150L and right sealing jaw 150R can be better appreciated, particularly with respect to the objectives of this invention. Each of the sealing jaws 150L and 150R comprises respectively, the outer frames 152, cutting and perforating structures including the knives 157 and 160, the inner grippers 162 and 163, the heating blocks 164 and cooling elements 165. The outer frame 152R comprises the generally horizontally disposed upper and lower outer gripper bars 153R and 155R and a vertical backplate 170R that extends the full width of the sealing jaw 150R. Consequently, the outer frame 152R has a rigid U-shaped structure. Typically the frame 152R is fixed to the previously discussed carriage structure for reciprocal motion. The outer frame 152L includes the upper and lower outer gripper members 153L and 155L and a vertical backplate 170L that define a rigid U-shaped structure. The outer frame 152 can be formed of discrete portions or as a single integral member. The outer frames 152 generally mount on the carriage along rails or other structures for allowing the outer frames 152 to reciprocate in a horizontal plane with respect to the web material 151. An actuator 171 and link 172 shown in FIG. 4 schematically depict the apparatus for producing this simultaneous reciprocal motion of both sealing jaws 150L and 150R.

FIGS. 4 through 7 also depict resilient rectangular gripping pads 173 and 174 that are disposed in the end surfaces 154L and 156L of the upper and lower gripping bars 153L and 155L. The pads 173 and 174 can also be formed with other cross-sections to fit in complementary milled slots to optimize the particular interface between the resilient pads 173 and 174 and the counterfacing surfaces 154R and 156R. In some applications it may also be desirable to incorporate resilient pads in the gripping surfaces 154R and 156R. The gripping surfaces 154R and 156R may also be roughened or corrugated to improve the gripping force exerted against the web 151 when the sealing jaws 150 close to the position shown in FIG. 6.

Now referring to the heating blocks 164, the heating block 164L mounts for linear motion in a horizontal direction between the positions shown in FIGS. 5 and 6. The heating block 164R attaches to the backplate 170R by means of shock resistent mounts 175 to relieve any stresses that occur when the heating block 164L moves into contact with the stationary heating block 164R. Apparatus for reciprocating the heating block 164L is known and represented diagrammatically by an actuator 176 and linkage 177.

Both the heating blocks 164L and 164R otherwise have identical structures so reference is made particularly only to the heating block 164R for an initial understanding of construction and function of the heating blocks. Specifically the heating block 164R includes a base 180R that carries a heating apparatus represented schematically as heating cartridges 181R. Upper and lower horizontal arms 182R and 183R extend parallel and proximate to the upper and lower gripper bars 153R and 155R respectively. The free ends of the arms 182R and 183R are chamfered to produce the heat sealing surfaces 104R and 105R. Typically these heat sealing surfaces are coated with a material such as polytetrafluoroethylene for facilitating the release of the heat sealing jaws from the web material 151. As particularly shown in FIG. 6, this structure produces the heat sealing surfaces 104L and 105L that counterface sealing surfaces 104R and 105R on the heat sealing block 164R that, collectively, produce the corresponding seals 104 and 105 in the bag as shown in FIG. 1.

Figure 7:
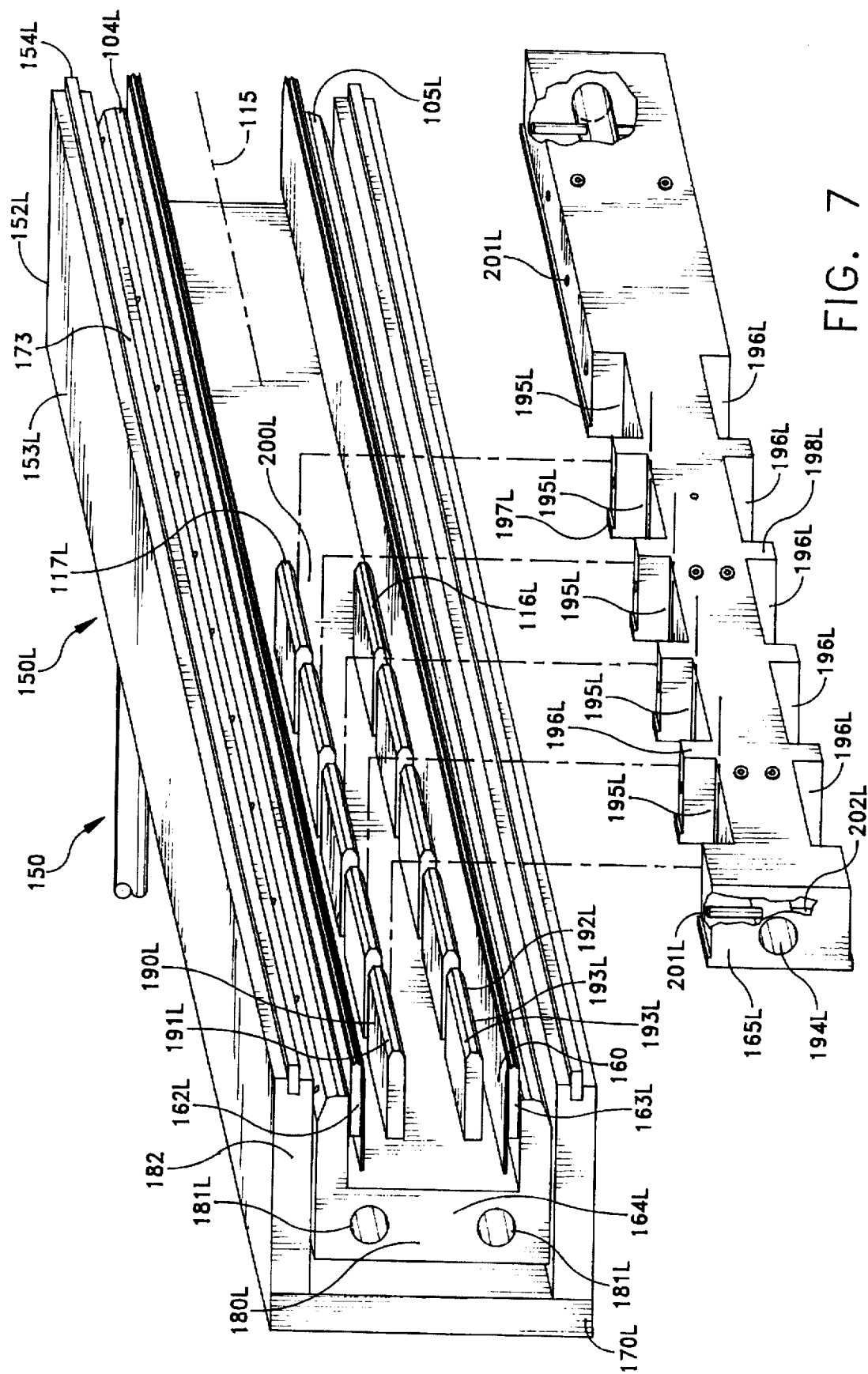
FIG. 7 is an exploded view of one sealing jaw shown in FIG. 4.
Figure 8:
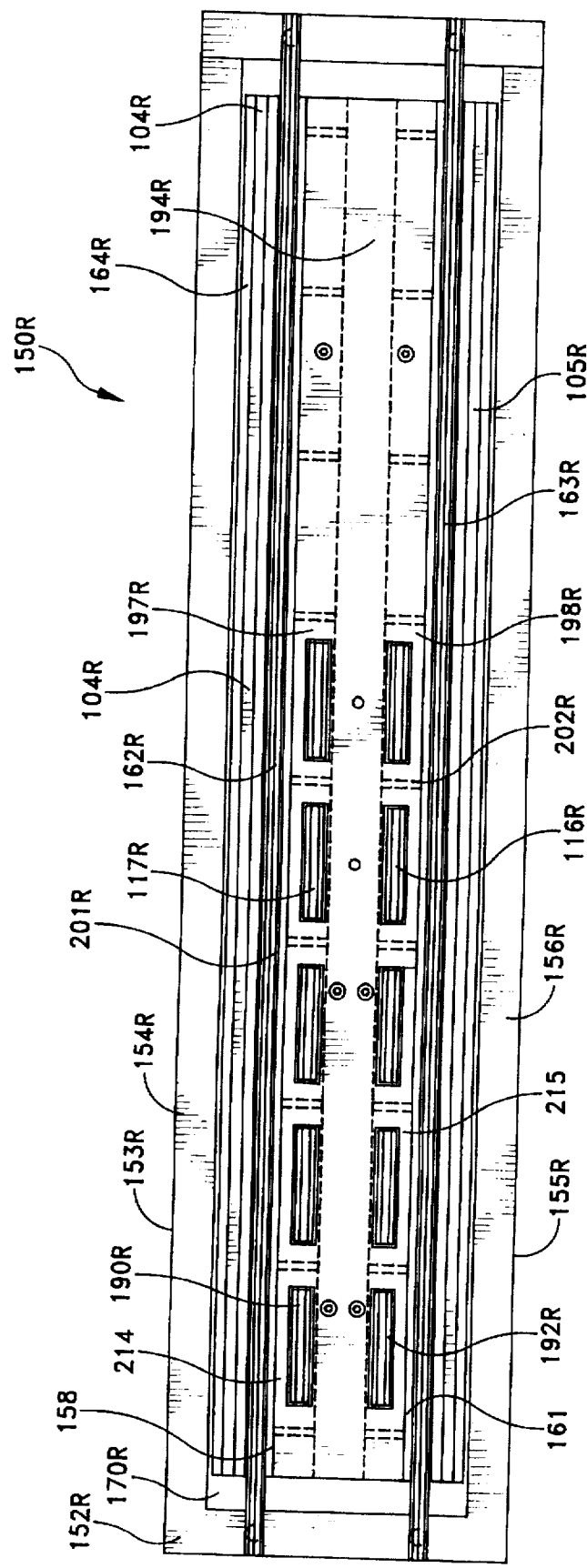
FIG. 8 is a front view of the other sealing jaw shown in FIG. 4.

Also particularly shown in reference to FIGS. 5, 6 and 8, the heating block 164R contains a plurality of individual fingers that form the heat sealing surfaces 116R and 117R. In this particular case the structure of these can be best seen by referring to FIGS. 4 and 7 that depict the front jaw 150L. The structure includes a first plurality of fingers 190L extending along a line parallel to the axis 115 and proximate the upper internal gripper bar 162L. Each of the fingers 190L is an integral portion of the base 180L and has chamfered edges 191L to form the vertical sealing surfaces 117L. A similar set of fingers 192L are spaced along a line parallel to the axis 115 and proximate the lower internal gripper bar 163L. Each finger 192L contains chamfered surfaces 193L to form the vertical heat sealing surfaces 116L. The heat sealing surfaces 116L and 117L thereby form a series of spaced elongated sealing surfaces disposed at opposite sides of the axis 115 and intermediate the internal grippers 162L and 163L. Each of the fingers 190L and 192L faces a corresponding finger 190 for 192R.

The fingers 190R and 192R are not chamfered thereby to provide planar sealing surfaces 116R and 117R for aligning with the counterfacing chamfered fingers that define sealing surfaces 116L and 117L. As will be apparent, when the actuator 171 and the actuator 176 advances the sealing jaw 150L and the heating block 164L to the positions shown in FIG. 6, the heat sealing surfaces 116L and 116R and 117L and 117R produce the rows of spaced seals 116 and 117, respectively.

In accordance with one aspect of this invention, each of the sealing jaws 150 includes cooling elements 165L and 165R having substantially the same construction. Initially reference is only made to the cooling element 165L as shown in FIG. 7. This element 165L comprises a rectangular block of heat conductive material having a central passage 194L formed therethrough for receiving a coolant, such as cooled air or other gaseous coolant, and discharging it from the other end. In this particular embodiment the passage 194L is shown as a through passage, but the passage might include angular offsets to accommodate the configuration of a particular set of jaws.

The cooling element 165L additionally comprises a series of upper notches 195L that correspond in position to the location of the fingers 190L and a corresponding set of lower notches 196L that register with the fingers 192L. Upper fingers 197L and lower fingers 198L extend intermediate the fingers 190L and 192L, respectively. Thus the cooling block 165L essentially interfits in a channel 200L defined between the fingers 190L and 192L and partially surrounds each sealing finger.

The cooling block 165L additionally comprises a plurality of upper air passages 201L and lower air passages 202L that exit through top and bottom surfaces of the block 165L including through the fingers 196L and 197L. These passages may extend vertically from the passage 193L or may be angled to direct air in a direction from the base 180L toward the web 151. As the surfaces of the upper fingers 196L and the lower fingers 197L are proximate the cutting knife 157 and the perforation knife 160, the ejected cooling air is directed along the surface of the knives to maintain them at a relatively cool temperature.

With respect to the rear sealing jaw 150F, the cooling block 165R has a corresponding structure, except that the upper and lower gripper bars 162R and 163R are formed integrally with the cooling block and define the recesses 158 and 161 through which air also is ejected toward the web 151. Consequently, the cooling air flowing over the blades 157 and 160 from the cooling block 165L tends to maintain the knife blades at a temperature that is below the fusion temperature for the polyethylene film of the web 151. After the knives penetrate, the combined air flow from both sealing jaws 150 further act to maintain the knives below the melting temperature of the polyethylene. This essentially overcomes any tendency of film to accumulate on the knife blades and allows them to form cleaner cuts and perforations and to penetrate and retract from the film without dragging melted film on their respective surfaces.

The fixed upper and lower internal grippers 162R and 163R and the movable upper and lower grippers 162L and 163L support the web material 151. Each of the movable grippers 162L and 163L is formed as a plate that lies parallel to the axis 115 and that is mounted for reciprocal motion with respect to the outer frame 152L and heat sealing block 164L. Upper springs 210 and lower springs 211 attach to the backplate 170L and extend through apertures in the heating block base 180L to drive the upper and lower movable internal grippers 162L and 163L toward the web material 151 to a position shown in FIG. 5 wherein the free ends 212L and 213L extend beyond the leading cutting edges of the knife blades 157 and 160. These ends 212 are corrugated or formed to have an erose edge surface that engage complementary surfaces 212R and 213R at the ends of fixed internal gripper bars 162R and 163R. Whereas the cooling block 165L shown in FIG. 7 is shown with an interrupted surface at each of the passages 194L and 195L, the upper and lower portions 214 and 215 of the cooling bars are continuous on the structure, thereby to provide a continuous backing surface for the film. Springs 210 and 211 are adjustable through some adjustment structure, as represented by adjusting screws 215 shown in FIGS. 5 and 6.

OPERATION

As the actuator 171 in FIG. 4 drives its linkage 172 and the connected sealing jaws from the retracted position shown in FIG. 5 toward the closed position shown in FIG. 1, contact initially occurs between the internal grippers 162 and 163. As the sealing jaws 150 close further, the internal grippers 162L and 163L compress the springs 210 and 211. Consequently, the internal grippers 162 and 163 hold the web material 151 in a plane while portions 213R and 214R of the cooling block 165R intermediate the fingers 190R and 192R and the recesses 158 and 161, respectively, back the web 151.

As actuator 171 in FIG. 4 displaces the sealing jaws still closer together, the gripper pads 173 and 174 eventually clamp the web material 151 against the surfaces 154R and 156R. At this point, the various grippers 153, 155, 162 and 163 fully support the web material 151 in a planar configuration necessary to assure seals that are functionally and aesthetically acceptable. Additional displacement of the heating block 164L to the right by the actuator 176, clamps the film web material between the sealing surfaces 104, 105, 116 and 117 to form the corresponding seals. Although the sealing surfaces are above the fusing temperature, the cooling air bathing the blades 157 and 160 prevents fusing at those locations while the seals 104, 105, 116 and 117 form.

After a dwell interval during which the polyethylene seals form, the actuator 176 in FIG. 4 withdraws the movable heat sealing body 164L toward the backplate 170L until the heat sealing surfaces 104L, 105L, 116 and 117L and knives 157 and 160 move behind the plane defined by the gripping surfaces 154L and 156L, such as shown in FIG. 5. This occurs while the external grippers 153 and 155 and internal grippers 162 and 163 continue to support the web material 151. As the blades 157 and 160 continue to be cooled by the cooling air, they tend to withdraw from the film without dragging polyethylene material with the blades thereby to prevent the film build up and to leave a cut edge 118 formed by the blade 157 and the perforated line 106 formed by the knife 160 in an aesthetically pleasing form without rough edges or dross.

Next, the actuator 171 in FIG. 4 begins to retract the sealing jaws 150 from each other. Initially the gripping surfaces 154L and 156L disengage from the web material 151, but the internal grippers 162 and 163 continue to support the web material 151 proximate the blades 157 and 160. Further retraction or separation of the sealing jaws 150 enables the internal grippers 162L and 163L to disengage from the web material 151, so the bag formed below the knife blade 157 drops as a finished product. The seal 104 formed by the sealing surfaces 104L and 104R immediately above the grippers 162L and 162R defines the bottom seal across the next bag to be filled and sealed in succession. As previously indicated, after the sealing jaws 150 are fully retracted, their supporting carriage elevates or otherwise positions the sealing jaws 150 for forming the next seal whereupon the process repeats.

In summary there has been disclosed an embodiment of a reclosable storage bag that allows an individual to reclose a sealed bag after it is opened and one embodiment of sealing jaws that produce that bag and that operate more efficiently than prior art devices. Like prior art reclosable bags the assignee of this invention, the bag is easy to open and contains a reclosure tie that facilitates subsequent closure and reopening of the bag. The bag, with its integral reclosure tie, does not require the addition of any discrete elements or special components to the bag. Manufacturing does not produce waste materials and any additional manufacturing costs are limited primarily to the cost of additional material and a small margin portion. In each bag the reclosure bag is readily detached and used and, with its strong internal loop portion and tail portion, provides an easy to use reclosure structure.

The sealing jaws that produce the spaced sets of seals along parallel axes across a portion of this reclosure tie have a structure that minimizes the accumulation of film on components of the sealing jaws during manufacture. Reducing the accumulation rate extends the interval during which the system can operate without the requirement for cleaning or other preventive maintenance. Increasing the operating time as a percentage of total available operating time has the effect of increasing throughput and further reducing the cost of the reclosure tie. Moreover, the inner and outer gripper bars fully support the web material during the cutting, perforation and sealing operations to further assure a reliable formation of the necessary seal of the various seals and the effective operation of the knives. This assures the quality of the overall bag with respect to the integrity of any freshness seals and the aesthetic appearance of the sealed margin portion including the reclosable tie. Moreover, the sealing jaws constructed in accordance with this invention limit all the moving parts of the structure to a single jaw. The other sealing jaw, with the exception of some stress relief mounts, contains fixed components. This further increases the reliability of the overall manufacturing apparatus.

This invention has been disclosed in terms of certain embodiments. It will be apparent that many modifications can be made to the disclosed apparatus without departing from this invention. The specific configuration of the heat sealing fingers could be modified to produce different seal configurations. If bags do not have bag seams, the extension of the sets of spaced seals can be varied for optimizing different relationships between the length of the loop and the tail portion. The sealing jaws may or may not include the heat sealing surfaces for producing freshness seals at both openings. Alternative methods, operating sequences and apparatus may also be substituted for the specifically disclosed methods and apparatus with the attainment or some or all of the specific advantages of the disclosed embodiments. For example, the particularly disclosed sealing jaws move vertically on a carriage to draw the web material off a mandrel. This invention is also adapted for systems in which other apparatus draws the web material past the sealing jaws so that vertical travel of the sealing jaws is not necessary. Therefore, it is the intent of the appended claims to cover all such variations and modifications as come within the true spirit and scope of this invention.

What is claimed as new and desired to be secured by Letters Patent of the United States is:

1. Apparatus for forming, from a sealable, elastic polymeric film in the form of a continuous cylinder extending along a first axis, storage bags with contents pouches and integrally formed, reclosure tie means for reclosing each bag, said apparatus comprising:

A. first spaced parallel clamping means for clamping a portion of the continuous cylinder along spaced parallel second axes that are transverse to the first axis to form a margin portion in coextensive film wall portions of the continuous cylinder, the margin portion providing a boundary between successive storage bags and having first and second sections disposed along the second axes, B. second spaced parallel clamping means for clamping a portion of the margin portion intermediate said first clamping means, said second clamping means being spaced from and parallel said first clamping means and spaced from each other, C. perforating means for perforating the film wall portions in said margin portion along a perforation line that is parallel to the second axes, D. severing means for severing the film wall portions in the margin portion along a severance line that is parallel to and spaced from the second axes thereby to form a removable closure tie in the margin portion between the perforation and severance lines and to form an adjacent first sealing area, E. first sealing means for forming a first seal through the film wall portion along a line in the first sealing area intermediate said first and second clamping means that is parallel to the second axes and that is coextensive with the first and second sections, F. second sealing means for forming a line of spaced sealed portions through the film wall portion intermediate said plurality of second clamping means along a line in the removable closure tie that is parallel to the second axes and that is coextensive with only the first section to form a tail in the first section and to form a loop in the second section that is free of any film structure that fails by delamination.

2. Apparatus for forming storage bags as recited in claim 1 additionally comprising first and second counterfacing sealing jaw means mounted for relative movement along a third axis that is transverse to a plane defined by the first and second axes, said first clamping means including first spaced, transversely oriented, counterfacing gripper means parallel to the second axes for clamping the film thereby to form the margin portion therebetween and said second clamping means including second spaced, transversely oriented, counterfacing gripper means parallel to the second axes, one of said second gripper means being intermediate one of said first gripper means and said severing means and another of said second gripping means being intermediate another of said first gripper means and said perforating means.

3. Apparatus for forming storage bags as recited in claim 2 wherein one of said sealing jaw means includes means for biasing said second gripper means toward the other of said sealing jaw means, said second gripper means on said one sealing jaw means being displaced during a clamping action whereby said biasing means establishes a clamping force.

4. Apparatus for fusing storage bags as recited in claim 3 wherein said first gripper means on said one sealing jaw means lie in a plane and said biasing means positioning said second gripper means to be displaced beyond said plane when said sealing jaw means are separated.

5. Apparatus for forming storage bags as recited in claim 2 wherein each of said sealing jaws carries a sealing block and wherein said first sealing means includes first and second sets of counterfacing sealing arms that extend parallel to the second axes and terminate in first sealing areas thereby to define first and second seals across the major portions and spaced counterfacing sealing fingers lying along a line parallel to the second axes wherein one of said first and second sealing jaw body portions is movable with and independently of said gripper means.

6. Apparatus for forming storage bags as recited in claim 5 wherein each of said first and second sealing jaw means includes heating means for elevating the temperature of said sealing jaw and sealing fingers.

7. Apparatus for forming storage bags as recited in claim 5 wherein each of said sealing jaws additionally comprises cooling means for cooling said perforating and severing means.

8. Apparatus for forming storage bags as recited in claim 7 wherein said cooling means includes a cooling block in each of said sealing jaws for receiving cooling air in a main passage and having additional passages for directing the flow of the cooling air.

9. Apparatus for forming storage bags as recited in claim 8 wherein one of said sealing jaws carries said perforating and severing means and said cooling means thereon directs the cooling air onto said perforating and severing means.

10. Apparatus for forming storage bags as recited in claim 9 wherein said cooling means on the other of said sealing jaw means includes recesses for receiving said perforating and severing means and means for directing air into said recesses.

11. Apparatus for forming storage bags as recited in claim 9 wherein on one of said sealing jaws said cooling means includes closed passages for receiving said sealing fingers whereby said cooling means extends toward each of said sealing fingers.

12. Apparatus for forming storage bags as recited in claim 9 wherein said second sealing means includes first and second sets of counterfacing sealing fingers lying along spaced axes parallel to the second axes whereby said sealing jaws form a pair of spaced lines of spaced seals on the tail in the reclosure tie.

13. Apparatus for forming storage bags as recited in claim 12 wherein said cooling means includes a block intermediate said first and second sets of counterfacing sealing fingers and portions extending between said sealing fingers, said cooling means additionally including cooling air passage means for directing the cooling air.

14. Apparatus for forming storage bags as recited in claim 13 wherein at least one of said cooling means has portions between said fingers spaced from said cooling block whereby said cooling means extends about each said sealing finger.

* * * * *